US012712665B2

(12) United States Patent
Bansal et al.

(10) Patent No.: US 12,712,665 B2
(45) Date of Patent: Aug. 18, 2026

(54) RECEIVE PROCEDURE FOR EXTENDED LONG RANGE SUPPORTED DEVICES

(71) Applicant: NXP USA, Inc., Austin, TX (US)

(72) Inventors: Priyanka Bansal, Lakheri (IN); Hari Ram Balakrishnan, Chennai (IN); Rong Zhang, San Jose, CA (US); Rui Cao, Sunnyvale, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 317 days.

(21) Appl. No.: 18/636,115

(22) Filed: Apr. 15, 2024

(65) Prior Publication Data

US 2024/0348365 A1 Oct. 17, 2024

Related U.S. Application Data

(60) Provisional application No. 63/498,451, filed on Apr. 26, 2023.

(30) Foreign Application Priority Data

Apr. 13, 2023 (IN) ............................. 202341027368
Feb. 28, 2024 (IN) ............................. 202441014404

(51) Int. Cl.
*H04L 1/00* (2006.01)

(52) U.S. Cl.
CPC .......... *H04L 1/0045* (2013.01); *H04L 1/0061* (2013.01)

(58) Field of Classification Search
None
See application file for complete search history.

(56) References Cited

U.S. PATENT DOCUMENTS 12,604,342 B2 * 4/2026 Bhattacharya .... H04W 74/0816
2017/0047989 A1 * 2/2017 Oh .......................... H04L 69/22
2019/0082385 A1 * 3/2019 Shellhammer .......... H04L 47/25
2023/0370189 A1 * 11/2023 Liu ....................... H04L 5/0023
2024/0015059 A1 1/2024 Balakrishnan et al.
2024/0022365 A1 * 1/2024 Chen ................... H04L 27/2602
2024/0172278 A1 * 5/2024 Chen ................ H04W 74/0808

(Continued)

OTHER PUBLICATIONS

IEEE, "IEEE Std 802.11™-2020", IEEE Standard for Information Technology—Telecommunications and Information Exchange between Systems Local and Metropolitan Area Networks—Specific Requirements, 2020, 4379 pgs.

(Continued)

*Primary Examiner* — Lonnie V Sweet

(57) ABSTRACT

Embodiments of receiver device and method are disclosed. In an embodiment, a receiver device comprises a wireless transceiver arranged to receive and transmit packets, and a controller operably coupled to the wireless transceiver to process the packets, wherein the controller is configured to receive a packet from a transmitter device and process the packet using one or more of dual correlators and dual finite state machines (FSMs), wherein the dual correlators include a first correlator to detect extended long-range (ELR) packets and a second correlator to detect non-ELR packets, and wherein the dual FSMs include a first FSM to process the ELR packets and a second FSM to process the non-ELR packets.

20 Claims, 9 Drawing Sheets

(56) References Cited

U.S. PATENT DOCUMENTS

2025/0300916 A1* 9/2025 Asterjadhi ............ H04L 1/0045

OTHER PUBLICATIONS

IEEE, "IEEE P802.11-REVmdTM/D3.0", Draft Standard for Information Technology—Telecommunications and Information Exchange between Systems Local and Metropolitan Area Networks—Specific Requirements, Oct. 2019, 4647 pgs.

IEEE, "IEEE P802.11be™/D2.0", Draft Standard for Information technology—Telecommunications and information exchange between systems Local and metropolitan area networks—Specific requirements, May 2022, 873 pgs.

IEEE, "Part 11: Wireless LAN Medium Access Control (MAC) and Physical Layer (PHY) Specifications Amendment 1: Enhancements for High-Efficiency WLAN", IEEE Std 802.11ax™, Feb. 9, 2021, 767 pgs.

* cited by examiner

GENERIC PPDU

| L-STF | L-LTF | L-SIG (LP0) | LP1 | LP2 | LP3 | LP4,5,6... |
|---|---|---|---|---|---|---|

UHR ELR GENERIC PPDU

| L-STF | L-LTF | L-SIG (LP0) | RL-SIG (LP1) | U-SIG1 (LP2) | U-SIG2 (LP3) | X-SYM (OPTIONAL) | ELR-STF (OPTIONAL) | ELR-LTF | ELR-SIG | ELR-DATA |
|---|---|---|---|---|---|---|---|---|---|---|

FIG. 2

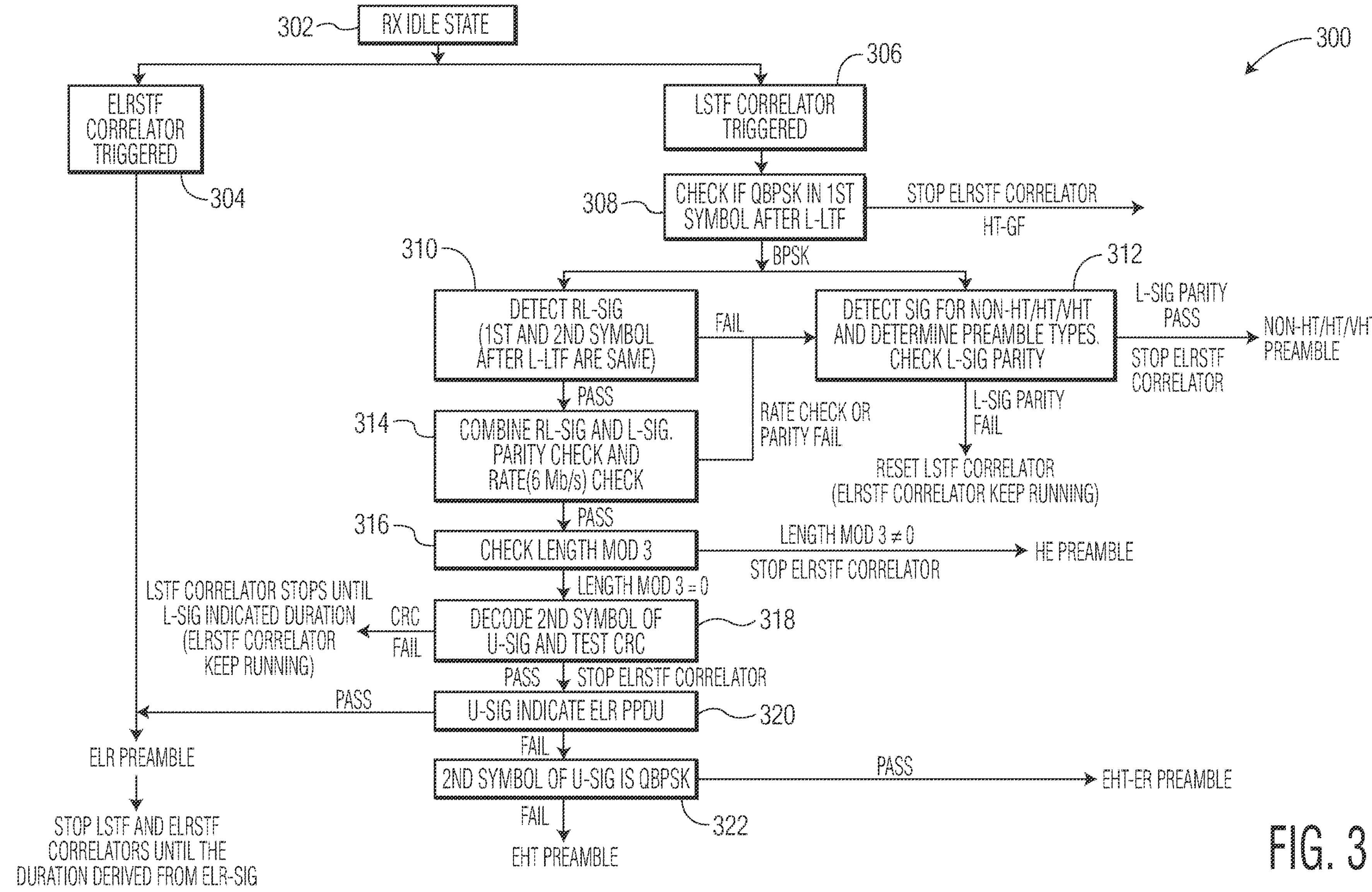
300
RX IDLE STATE
302
ELRSTF CORRELATOR TRIGGERED
304
LSTF CORRELATOR TRIGGERED
306
CHECK IF QBPSK IN 1ST SYMBOL AFTER L-LTF
308
STOP ELRSTF CORRELATOR
HT-GF
BPSK
DETECT RL-SIG (1ST AND 2ND SYMBOL AFTER L-LTF ARE SAME)
310
FAIL
DETECT SIG FOR NON-HT/HT/VHT AND DETERMINE PREAMBLE TYPES. CHECK L-SIG PARITY
312
L-SIG PARITY PASS
STOP ELRSTF CORRELATOR
NON-HT/HT/VHT PREAMBLE
L-SIG PARITY FAIL
RESET LSTF CORRELATOR (ELRSTF CORRELATOR KEEP RUNNING)
PASS
COMBINE RL-SIG AND L-SIG. PARITY CHECK AND RATE(6 Mb/s) CHECK
314
RATE CHECK OR PARITY FAIL
PASS
CHECK LENGTH MOD 3
316
LENGTH MOD 3 ≠ 0
STOP ELRSTF CORRELATOR
HE PREAMBLE
LENGTH MOD 3 = 0
DECODE 2ND SYMBOL OF U-SIG AND TEST CRC
318
CRC FAIL
LSTF CORRELATOR STOPS UNTIL L-SIG INDICATED DURATION (ELRSTF CORRELATOR KEEP RUNNING)
PASS
STOP ELRSTF CORRELATOR
U-SIG INDICATE ELR PPDU
320
PASS
ELR PREAMBLE
STOP LSTF AND ELRSTF CORRELATORS UNTIL THE DURATION DERIVED FROM ELR-SIG
FAIL
2ND SYMBOL OF U-SIG IS QBPSK
322
PASS
EHT-ER PREAMBLE
FAIL
EHT PREAMBLE
FIG. 3

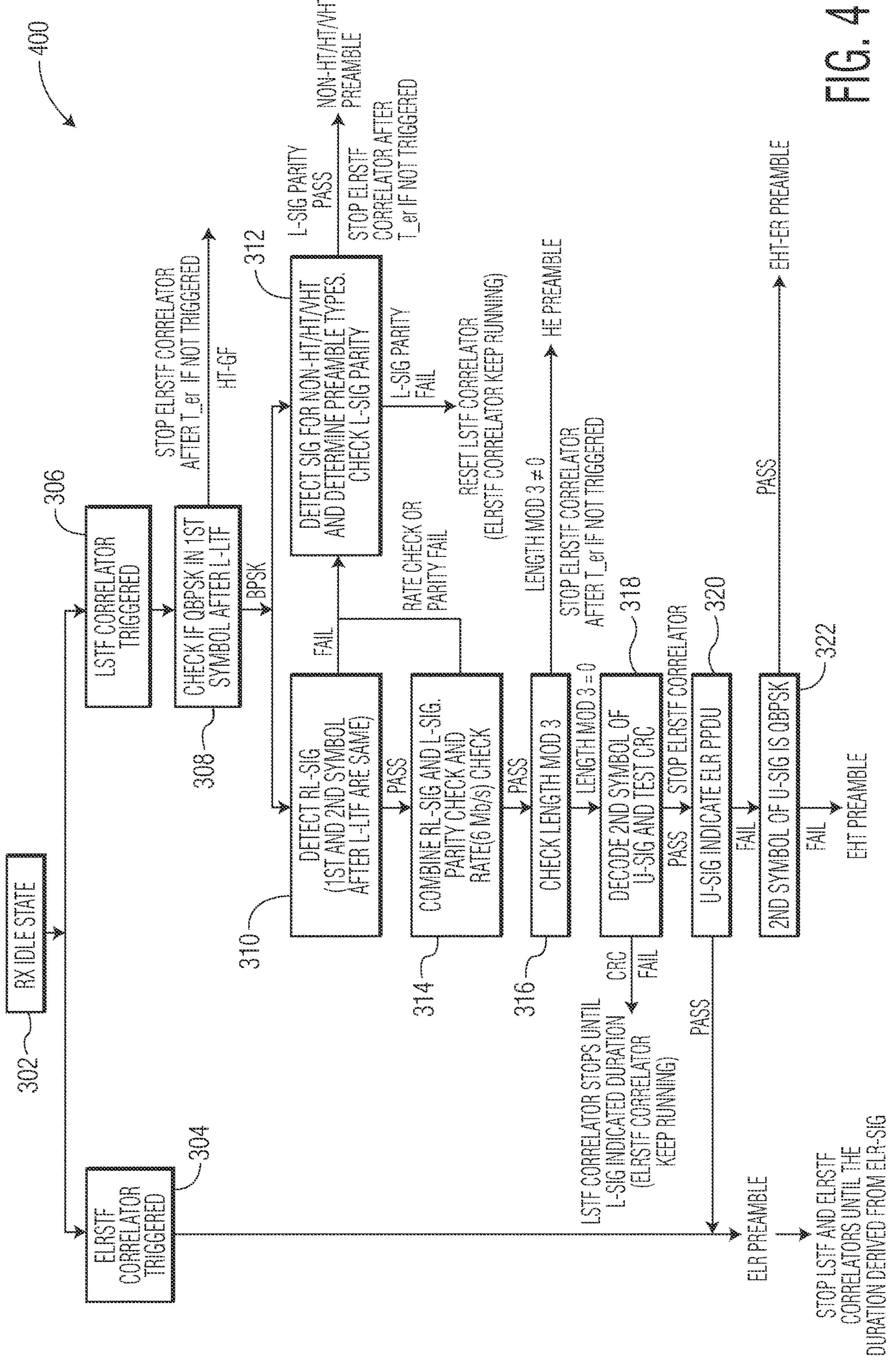
400
RX IDLE STATE
302
ELRSTF CORRELATOR TRIGGERED
304
LSTF CORRELATOR TRIGGERED
306
CHECK IF QBPSK IN 1ST SYMBOL AFTER L-LTF
308
STOP ELRSTF CORRELATOR AFTER T_er IF NOT TRIGGERED
HT-GF
BPSK
DETECT RL-SIG (1ST AND 2ND SYMBOL AFTER L-LTF ARE SAME)
310
FAIL
DETECT SIG FOR NON-HT/HT/VHT AND DETERMINE PREAMBLE TYPES. CHECK L-SIG PARITY
312
L-SIG PARITY PASS
NON-HT/HT/VHT PREAMBLE
STOP ELRSTF CORRELATOR AFTER T_er IF NOT TRIGGERED
L-SIG PARITY FAIL
RESET LSTF CORRELATOR (ELRSTF CORRELATOR KEEP RUNNING)
PASS
COMBINE RL-SIG AND L-SIG. PARITY CHECK AND RATE(6 Mb/s) CHECK
314
RATE CHECK OR PARITY FAIL
PASS
CHECK LENGTH MOD 3
316
LENGTH MOD 3 ≠ 0
HE PREAMBLE
STOP ELRSTF CORRELATOR AFTER T_er IF NOT TRIGGERED
LENGTH MOD 3 = 0
DECODE 2ND SYMBOL OF U-SIG AND TEST CRC
318
CRC FAIL
LSTF CORRELATOR STOPS UNTIL L-SIG INDICATED DURATION (ELRSTF CORRELATOR KEEP RUNNING)
PASS
STOP ELRSTF CORRELATOR
U-SIG INDICATE ELR PPDU
320
PASS
FAIL
2ND SYMBOL OF U-SIG IS QBPSK
322
PASS
EHT-ER PREAMBLE
FAIL
EHT PREAMBLE
ELR PREAMBLE
STOP LSTF AND ELRSTF CORRELATORS UNTIL THE DURATION DERIVED FROM ELR-SIG
FIG. 4

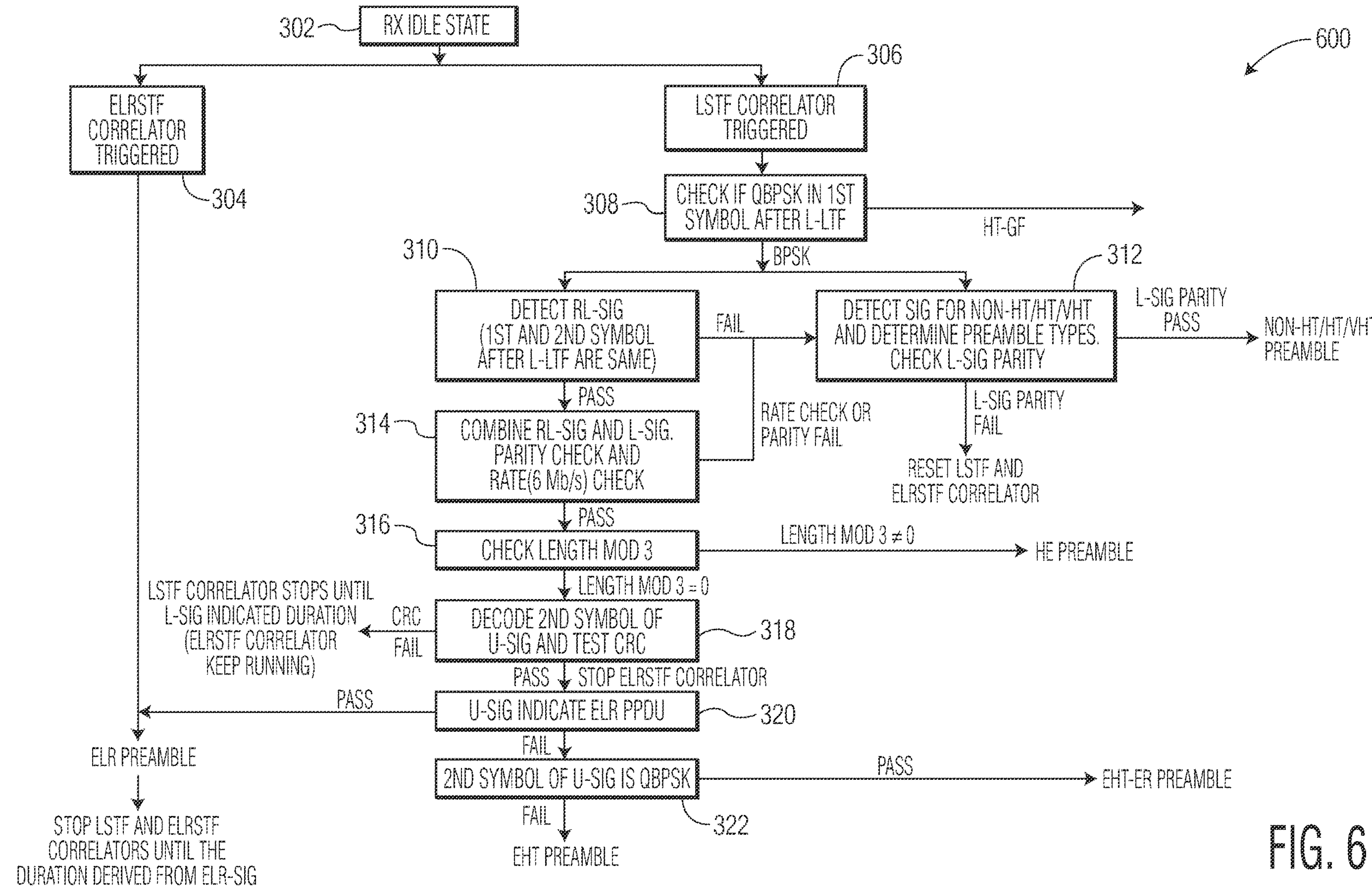
600
302
RX IDLE STATE
ELRSTF CORRELATOR TRIGGERED
304
LSTF CORRELATOR TRIGGERED
306
308
CHECK IF QBPSK IN 1ST SYMBOL AFTER L-LTF
HT-GF
BPSK
310
DETECT RL-SIG (1ST AND 2ND SYMBOL AFTER L-LTF ARE SAME)
FAIL
DETECT SIG FOR NON-HT/HT/VHT AND DETERMINE PREAMBLE TYPES. CHECK L-SIG PARITY
312
L-SIG PARITY PASS
NON-HT/HT/VHT PREAMBLE
PASS
314
COMBINE RL-SIG AND L-SIG. PARITY CHECK AND RATE(6 Mb/s) CHECK
RATE CHECK OR PARITY FAIL
L-SIG PARITY FAIL
RESET LSTF AND ELRSTF CORRELATOR
PASS
316
CHECK LENGTH MOD 3
LENGTH MOD 3 ≠ 0
HE PREAMBLE
LENGTH MOD 3 = 0
LSTF CORRELATOR STOPS UNTIL L-SIG INDICATED DURATION (ELRSTF CORRELATOR KEEP RUNNING)
CRC FAIL
DECODE 2ND SYMBOL OF U-SIG AND TEST CRC
318
PASS
STOP ELRSTF CORRELATOR
PASS
U-SIG INDICATE ELR PPDU
320
ELR PREAMBLE
FAIL
2ND SYMBOL OF U-SIG IS QBPSK
PASS
EHT-ER PREAMBLE
STOP LSTF AND ELRSTF CORRELATORS UNTIL THE DURATION DERIVED FROM ELR-SIG
FAIL
322
EHT PREAMBLE
FIG. 6

WIRELESS DEVICE
800
WIRELESS TRANSCEIVER
802
CONTROLLER
804
806
808

RECEIVE PROCEDURE FOR EXTENDED LONG RANGE SUPPORTED DEVICES

CROSS-REFERENCE TO RELATED APPLICATIONS

This application is entitled to the benefit of Indian Provisional Patent Application No. 20/2341027368, filed on Apr. 13, 2023, U.S. Provisional Patent Application Ser. No. 63/498,451, filed on Apr. 26, 2023, and Indian Provisional Patent Application No. 20/2441014404, filed on Feb. 28, 2024, which are incorporated herein by reference.

BACKGROUND

Wireless standards include extended long-range (ELR) packets, such as ELR physical layer protocol data units (PPDUs). In order to receive and process ELR packets, as well as non-ELR packets, a receiver station (STA) is designed to efficiently distinguish and process the different packets.

SUMMARY

Embodiments of receiver device and method are disclosed. In an embodiment, a receiver device comprises a wireless transceiver arranged to receive and transmit packets, and a controller operably coupled to the wireless transceiver to process the packets, wherein the controller is configured to receive a packet from a transmitter device and process the packet using one or more of dual correlators and dual finite state machines (FSMs), wherein the dual correlators include a first correlator to detect extended long-range (ELR) packets and a second correlator to detect non-ELR packets, and wherein the dual FSMs include a first FSM to process the ELR packets and a second FSM to process the non-ELR packets.

In an embodiment, the controller is configured to stop the first correlator when the packet is detected as a non-ELR packet.

In an embodiment, the controller is configured to, when the second correlator is triggered and when a legacy signal (L-SIG) parity check has failed, keep the first correlator running.

In an embodiment, the controller is configured to, when the second correlator is triggered and when a cyclic redundancy check (CRC) check fails at a Universal Signal (U-SIG) element of the packet, one of keep the first correlator running and allow the first correlator to run until an end of expected extended long-range short training field (ELR-STF) field and stop the first correlator until a legacy signal (L-SIG) derived length when the first correlator is not triggered as a positive correlation of a particular sequence input.

In an embodiment, the controller is configured to keep the first correlator running up to a T_er duration when the packet is detected as a non-ELR packet and stop the first correlator until an end of packet processing for the packet when the first correlator is not triggered as a positive correlation of a particular sequence input, where T_er is a duration of an extended long-range short training field (ELR-STF) field in the packet.

In an embodiment, the controller is configured to, when the packet is detected as a non-ELR packet and the packet has passed a cyclic redundancy check (CRC) check, stop the first correlator until an end of a packet duration.

In an embodiment, the controller is configured to, when the packet is detected as a non-ELR packet and the packet has failed a cyclic redundancy check (CRC) check, keep the first correlator running until an end of an expected extended long-range short training field (ELR-STF) field (T_usig+T_er) and stop the first correlator until a legacy signal (L-SIG) derived length when the first correlator is not triggered, where T_er is a duration of an extended long-range short training field (ELR-STF) field in the packet and T_usig is a duration from a start of a legacy short training field (L-STF) until an end of a Universal Signal (U-SIG) field.

In an embodiment, the controller is configured to stop the first correlator when the second correlator gets triggered as a positive correlation of a particular sequence input.

In an embodiment, the controller is configured to, when a cyclic redundancy check (CRC) check fails at a Universal Signal (U-SIG) element of the packet, stop the first correlator until a legacy signal (L-SIG) indicated duration.

In an embodiment, the first FSM includes a frame detection stage, where the packet is classified as an ELR packet using an ELR format detection or an ELR format indication.

In an embodiment, the ELR format detection includes a start time based on the start of the packet.

In an embodiment, the controller is configured to control the ELR format detection based on whether a receive time (RXTIME) of the packet is evaluated when the receiver device enters an ErrorAbort state based on a legacy payload 3 (LP3) field of the packet.

In an embodiment, the controller is configured to control the ELR format detection based on whether an exit condition is met when the receiver device does not enter an ErrorAbort state based on a legacy payload 3 (LP3) field of the packet.

In an embodiment, the controller is configured to allow only one of the first and second FSMs to be active.

In an embodiment, the controller is configured to use one or more primitives to support interactions of the dual FSMs with a media access control (MAC) of the receiver device.

In an embodiment, a method of processing received frames at a receiver device comprises receiving a packet from a transmitter device at the receiver device, and processing the packet at the receiver device using one or more of dual correlators and dual finite state machines (FSMs), wherein the dual correlators include a first correlator to detect extended long-range (ELR) packets and a second correlator to detect non-ELR packets and wherein the dual FSMs include a first FSM to process the ELR packets and a second FSM to process the non-ELR packets.

In an embodiment, processing the packet includes stopping the first correlator when the packet is detected as a non-ELR packet.

In an embodiment, processing the packet includes keeping the first correlator running when the second correlator is triggered and when a legacy signal (L-SIG) parity has failed.

In an embodiment, processing the packet includes stopping the first correlator when the second correlator has triggered as a positive correlation of a particular sequence input.

In an embodiment, a receiver device comprises a wireless transceiver arranged to receive and transmit packets, and a controller operably coupled to the wireless transceiver to process the packets, wherein the controller is configured to receive a physical layer protocol data unit (PPDU) from a transmitter device, and process the PPDU using one or more of dual correlators and dual finite state machines (FSMs), wherein the dual correlators include a first correlator to detect extended long-range (ELR) PPDUs and a second correlator to detect non-ELR PPDUs, and wherein the dual FSMs include a first FSM to process the ELR PPDUs and a second FSM to process the non-ELR PPDUs.

Other aspects in accordance with the invention will become apparent from the following detailed description, taken in conjunction with the accompanying drawings, illustrated by way of example of the principles of the invention.

BRIEF DESCRIPTION OF DRAWINGS

FIG. 2 illustrates a generic physical layer protocol data unit (PPDU) and an extended long-range (ELR) PPDU in accordance with an embodiment of the invention.

FIG. 3 shows a receive finite state machine (Rx FSM) that may be used to design a receiver STA in the communications system in accordance with a first embodiment of the invention.

FIG. 4 shows an Rx FSM that may be used to design a receiver STA in the communications system in accordance with a second embodiment of the invention.

FIG. 6 shows an Rx FSM that may be used to design a receiver STA in the communications system in accordance with a fourth embodiment of the invention.

Throughout the description, similar reference numbers may be used to identify similar elements.

DETAILED DESCRIPTION

Figure 1:
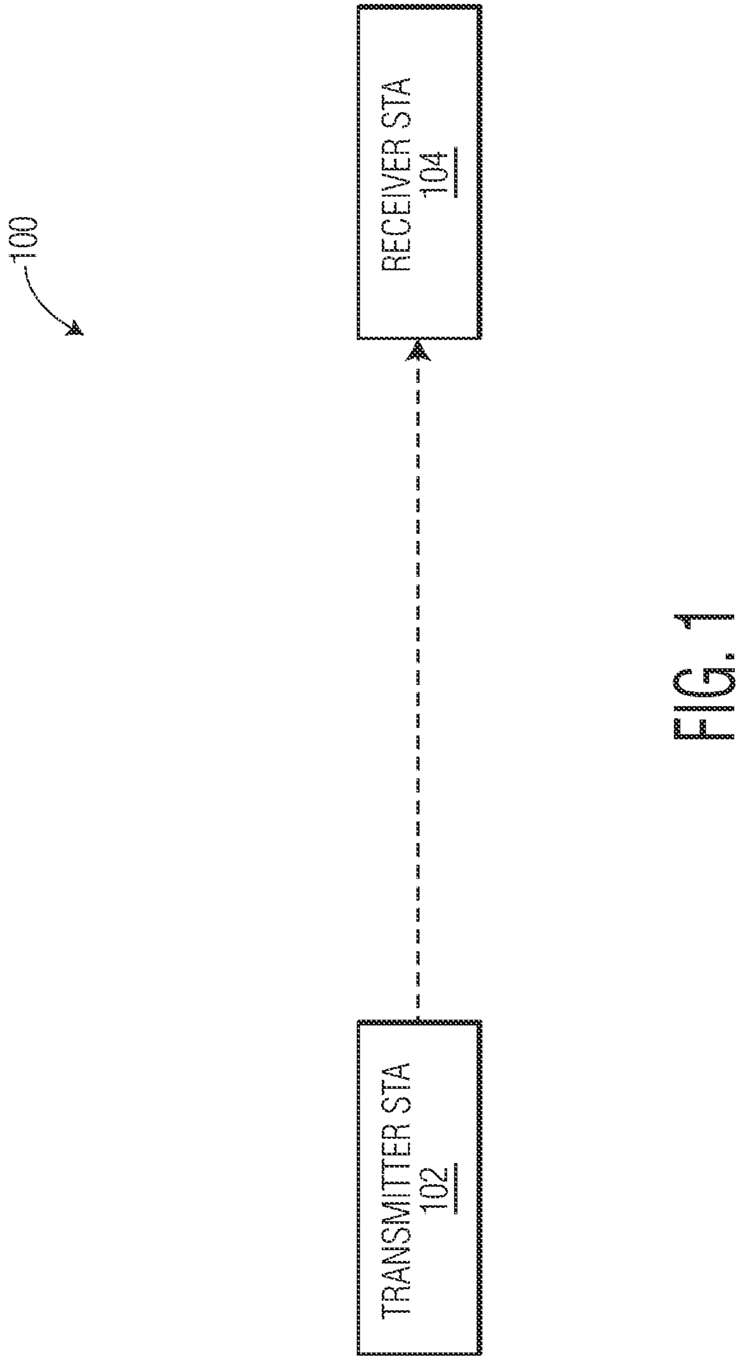
FIG. 1 depicts a communications system for wireless communications that can be used in embodiments of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Several aspects of WiFi systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

FIG. 1 depicts a communications system 100 for wireless (e.g., WiFi) communications that can be used in embodiments of the invention. In the embodiment depicted in FIG. 1, the communications system includes a transmitter station (STA) 102 and a receiver STA 104. The communications system 100 can be used in various applications, such as industrial applications, medical applications, computer applications, and/or consumer or enterprise applications. In some embodiments, the communications system may be a wireless communications system, such as a wireless communications system compatible with an IEEE 802.11 protocol. For example, communications system may be a wireless communications system compatible with an IEEE 802.11bn protocol. Various iterations of the 802.11 specification may be referred to herein.

In the embodiment depicted in FIG. 1, each of the transmitter STA 102 and the receiver STA 104 may be an access point (AP) or a non-AP station (STA). As an AP, the transmitter STA 102 or receiver STA 104 may be implemented in hardware (e.g., circuits), software, firmware, or a combination thereof. The AP may be fully or partially implemented as an integrated circuit (IC) device. In some embodiments, the AP may be a wireless AP compatible with at least one WLAN communications protocol (e.g., at least one IEEE 802.11 protocol). In some embodiments, the AP may include at least one antenna, at least one transceiver operably connected to the at least one antenna, and at least one controller operably connected to the corresponding transceiver. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver.

As a non-AP STA, the transmitter STA 102 or receiver STA 104 may be implemented in hardware (e.g., circuits), software, firmware, or a combination thereof. The non-AP STA may be fully or partially implemented as an IC device. For example, the non-AP STA may be implemented in a laptop, a desktop personal computer (PC), a mobile phone, or other communications device that supports at least one WLAN communications protocol. The non-AP STA may be a communications device compatible with at least one IEEE 802.11 protocol (e.g., an IEEE 802.11bn protocol, an IEEE 802.11be protocol, an IEEE 802.11ax protocol, or an IEEE 802.11ac protocol). In some embodiments, the non-AP STA may include at least one antenna, at least one transceiver operably connected to the at least one antenna, and at least one controller connected to the corresponding transceiver. In some embodiments, at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver.

The receiver STA 104 may receive packets from one or more transmitter STAs, such as the transmitter STA 102. However, different transmitter STAs may be configured to transmit extended long-range (ELR) packets, such as ELR physical layer protocol data units (PPDUs), or non-ELR packets, such as generic or non-ELR PPDUs. The non-ELR packets includes, but not limited to, Legacy, High Throughput (HT), Very High Throughput (VHT), High Efficient WLAN (Hew), Extremely High Throughput (EHT), Hew-ELR and EHT-ELR packets. Thus, in order to receive and process the ELR or non-ELR packets, receiver STA 104 is designed to process the received packets using dual correlators or dual finite state machines (FSMs), as described below.

Turning now to FIG. 2, a generic PPDU and an ELR PPDU in accordance with an embodiment of the invention are shown. The generic PPDU includes a legacy short training field (L-STF) element, a legacy long training field (L-LTF) element, a legacy signal (L-SIG) element, a legacy payload 1 (LP1) element, an LP2 element, an LP3 element and additional LPs elements. The ELR PPDU includes an L-STF element, an L-LTF element, an L-SIG element, a Repeated Non-HT Signal (RL-SIG) element, a Universal Signal 1 (U-SIG1) element, a Universal Signal 2 (U-SIG2) element, an X-SYM, an ELR short training field (ELR-STF) element, an ELR long training field (ELR-LTF) element, an ELR Signal (ELR-SIG) field and an ELR data (ELR-DATA) element. These different elements of the generic and ELR PPDUs may be used to describe the receiving functionalities of the receiver STA 104.

FIG. 3 shows a receive finite state machine (Rx FSM) 300 that may be used to design the receiver STA 104 in accordance with a first embodiment of the invention. In this embodiment, the receiver STA 104 includes dual correlators, an extended long-range short training field (ELRSTF) correlator for ELR packets and a legacy short training field (L-STF) correlator for non-ELR packets. The Rx FSM 300 includes an idle state 302, which transitions to a state 304, where the ELRSTF correlator is triggered, and a state 306 where the LSTF correlator is triggered. In an embodiment, each of the ELRSTF and LSTF correlators may be triggered when correlation values of a particular sequence input to the correlator is above one or more predefined triggering thresholds, i.e., a positive correlation of the particular sequence input. Initially, the Rx FSM may be in the idle state 302. Both the ELRSTF correlator and the LSTF correlator are initially running, which may be independently or collectively stopped under certain conditions, as described below.

When the ELRSTF correlator is triggered at state 304, the received packet is assumed to be an ELR packet. The packet is then processed to a point in time when the ELR preamble is detected, at which point the LSTF and ELRSTF correlators are stopped until the duration derived from ELR-SIG.

After the LSTF correlator is triggered at state 306, the Rx FSM 300 transitions to a state 308, where a check is performed to see if Binary Phase Shift Keying (BPSK) rotated 90° relative to L-SIG (QBPSK) is in the 1$^{st}$ symbol after L-LTF. If QBPSK is in the 1$^{st}$ symbol after L-LTF, then the ELRSTF correlator is stopped because high-throughput Greenfield format (HT-GF) is detected. If BPSK is detected, then the Rx FSM transitions to a state 310, where a detection of RL-SIG is performed, and state 312, where a detection of SIG for non-HT, HT or VHT is performed, the preamble type is determined and the L-SIF parity is checked. In an embodiment, RL-SIG is detected when 1$^{st}$ and 2$^{nd}$ symbols after L-LTF are same. At state, if L-SIG parity check has passed, then the ELRSTF correlator is stopped and the process proceeds to detect non-HT, HT or VHT preamble. However, if L-SIG parity check has not passed, then the ELRSTF correlator is allowed to keep running and the LSTF correlator is reset.

If RL-SIG is not detected at state 310, then the Rx FSM 300 transitions to state 312. However, if RL-SIG is detected at state 310, then the Rx FSM transitions to state 314, where RL-SIG and L-SIG are combined. In addition, parity and rate (e.g., expected rate is 6 Mb/s) are checked. If the rate check or parity check fails, then the Rx FSM transitions to state 312. If the checks pass, then the Rx FSM transitions to state 316, where LENGTH mod 3 is checked. If LENGTH mod 3 is not equal to zero (0), then the ELRSTF correlator is stopped and the process proceeds to detect High Efficiency (HE) preamble. If LENGTH mod 3 is equal to zero (0), then the Rx FSM transitions to state 318.

At state 318, 2$^{nd}$ symbol of U-SIG is decoded and a cyclic redundancy check (CRC) is tested. If the CRC check has failed, then the ELRSTF correlator is allowed to keep running and the LSTF correlator is stopped until L-SIG indicated duration. If the CRC check has passed, then the ELRSTF correlator is stopped and the Rx FSM 300 transitions to state 320, where a check is made whether U-SIG (i.e., U-SIG1 and/or U-SIG2) indicates an ELR PPDU. If the check has passed, i.e., U-SIG indicates an ELR PPDU, then the receiver STA 104 proceeds to process the received packet as an ELR packet, including detecting an ELR preamble. If the check has failed, i.e., U-SIG does not indicate an ELR PPDU, then the Rx FSM 300 transitions to state 322, where a check is made to determine whether the 2nd symbol of U-SIG is QBPSK. If the check has passed, i.e., the 2nd symbol of U-SIG is QBPSK, then the process proceeds to process the packet as an EHT-ELR packet, including detecting an EHT-ELR preamble. If the check fails, i.e., the 2nd symbol of U-SIG is not QBPSK, then the receiver STA 104 proceeds to process the packet as an EHT packet, including detecting an EHT preamble.

Thus, in this embodiment, when a packet is classified as a non-ELR packet, then the ELRSTF correlator may be stopped, and the packet may be processed as a non-ELR packet. For example, when the packet is classified as HT-GF at state 308, when the packet is classified as a non-HT, HT or VHT packet at state 312, when the packet is classified as HE at state 316, or when the packet is classified as an EHT-ELR packet or an EHT packet at state 322. Further, the ELRSTF correlator may start again after a duration derived from the length of the L-SIG. When the ELRSTF correlator is triggered (state 304) at any point in time, the packet may be considered as an ELR packet. When a CRC failure occurs in an U-SIG field (state 318), the ELRSTF correlator may continue operation. Alternatively, the ELRSTF correlator may be operated until the end of the expected ELRSTF field.

When the ELRSTF correlator is not triggered, the ELRSTF correlator may be stopped until the L-SIG indicated duration. When the ELR preamble is detected, the ELRSTF correlator and LSTF correlator may be stopped until the duration derived by the ELR-SIG field of the packet.

FIG. 4 shows an Rx FSM 400 that may be used to design the receiver STA 104 in accordance with a second embodiment of the invention. Similar to Rx FSM 300, the Rx FSM 400 includes the states 302-322. However, at state 306, if QBPSK is not in the 1$^{st}$ symbol after L-LTF, then the ELRSTF corrector is stopped after the duration of the ELR-STF field in the received ELR PPDU (T_er) if the ELRSTF correlator is not triggered. Similarly, at state 312, if the packet passes the L-SIG parity check, then the ELRSTF corrector is stopped after T_er if the ELRSTF correlator is not triggered. Also, at state 316, if the LENGTH mod 3 is not equal to zero (0), then the ELRSTF corrector is stopped after the duration of the ELR-STF (T_er) if the ELRSTF correlator is not triggered.

Thus, in this embodiment, the ELRSTF correlator may initially operate until T_er regardless of whether the packet detected is an ELR packet or a non-ELR packet. The duration of the check may be measured from the start of the L-STF. The start of the L-STF may be estimated based on a symbol boundary estimation from the L-STF and/or the L-LTF. When the ELRSTF correlator is not triggered until T_er, the LSTF correlator may get triggered. The ELRSTF correlator may resume operation after the duration derived from the LENGTH of the L-SIG.

Figure 5:
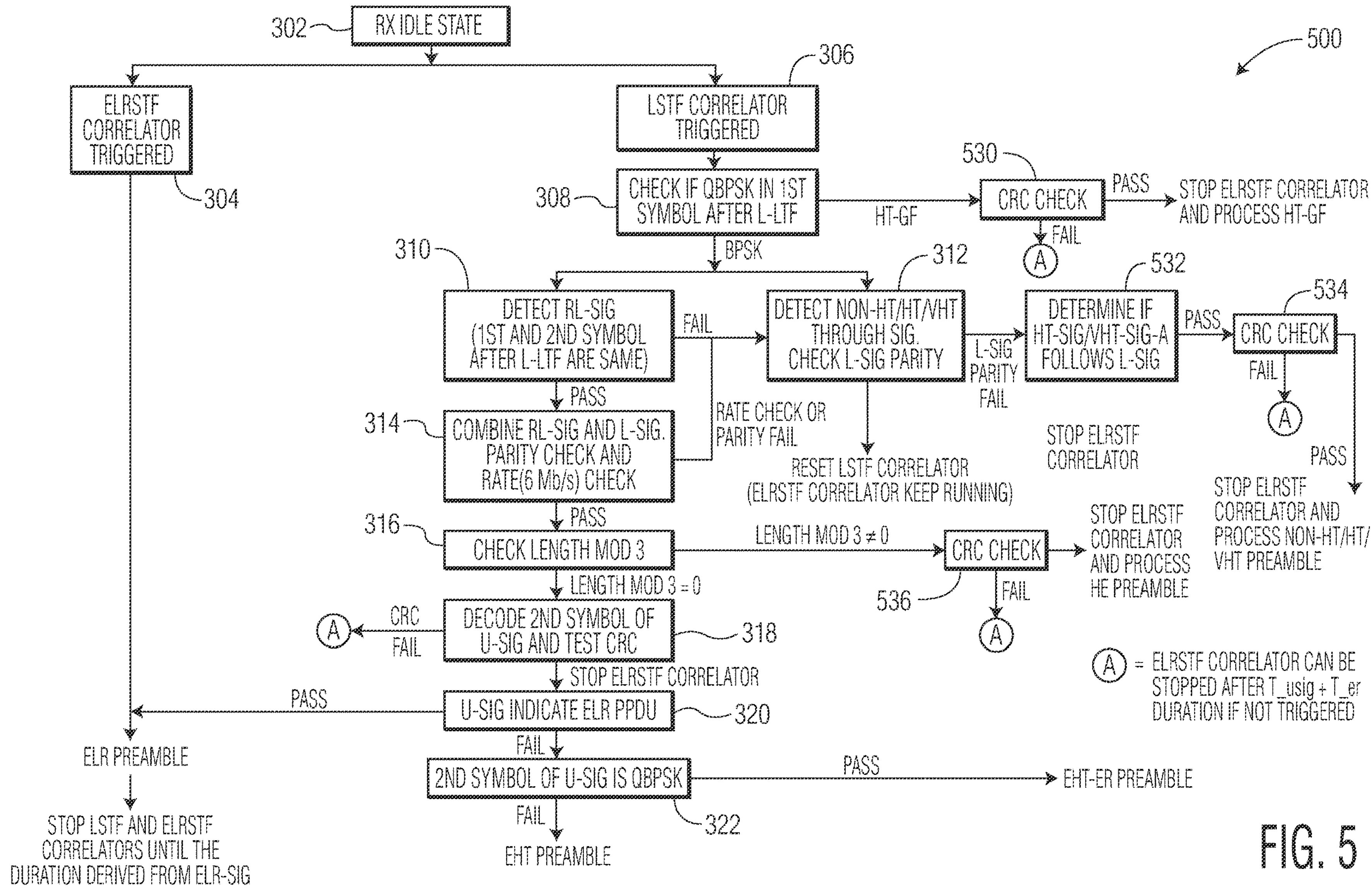
FIG. 5 shows an Rx FSM that may be used to design a receiver STA in the communications system in accordance with a third embodiment of the invention.

If the ELRSTF correlator is triggered at any point in time, the packet may be considered as an ELR packet. Further, in case of CRC failure in the U-SIG, the ELRSTF correlator may be kept operational. Alternatively, the ELRSTF correlator may operate until the end of the expected ELR-STF field, that is, the ELR-STF duration from the U-SIG symbol boundary. If the ELRSTF correlator is not triggered, the ELRSTF correlator may be stopped until the L-SIG indicated duration. When the ELR preamble is detected, the ELRSTF correlator and LSTF correlator may be stopped until the duration derived from the ELR-SIG field of FIG. 5 shows an Rx FSM 500 that may be used to design the receiver STA 104 in accordance with a third embodiment of the invention. Similar to the Rx FSM 300, the Rx FSM 500 includes the states 302-322. However, the Rx FSM 500 further includes states 530, 532, 534 and 536.

At state 530, after the packet is assumed to be an HT-GF packet at state 308, a CRC check is performed. If the packet passes the CRC check, then the ELRSTF correlator is stopped and the packet is processed as an HT-GF packet. However, if the packet fails the CRC check, then the ELRSTF correlator may be stopped after T_usig+T_er duration if the ELRSTF correlator is not triggered, where T_usig is the duration from the start of the L-STF field until the end of the U-SIG field.

At state 532, after the packet has passed L-SIG parity check at state 312, a determination is made whether HT-SIG or VHT-SIG-A follows L-SIG. If the packet passes, then, at state 534, a CRC check is performed. If the packet passes the CRC check, then the ELRSTF correlator is stopped and the packet is processed as a non-HT, HT or VHT packet, including detecting a non-HT, HT or VHT preamble. However, if the packet fails the CRC check, then the ELRSTF correlator may be stopped after T_usig+T_er duration if the ELRSTF correlator is not triggered.

At state 536, after determining LENGTH mod 3 does not equal zero (0) at state 316, a CRC check is performed. If the packet passes the CRC check, then the ELRSTF correlator is stopped and the packet is processed as an HT-GF packet. However, if the packet fails the CRC check, then the ELRSTF correlator may be stopped after T_usig+T_er duration if the ELRSTF correlator is not triggered.

Thus, in this embodiment, the ELRSTF correlator may operate when the CRC check passes regardless of whether the detected packet corresponds to the ELR packet or the non-ELR packet. When the CRC check fails, and when the ELRSTF is not triggered, the ELRSTF correlator may be stopped after T_usig+T_er duration. Further, the ELRSTF correlator may start operating again after the predicted duration of the packet. The predicted duration of the packet may be derived by the LENGTH field of the L-SIG.

When the ELRSTF correlator is triggered (state 304) at any point in time, the packet may be considered as an ELR packet. When the ELR preamble is detected, the ELRSTF correlator and the LSTF correlator may be stopped until the duration derived from the ELR-SIG field of the packet.

The T_usig U-SIG symbol boundary may be based on the symbol boundary estimation from L-STF. For example, the start of L-STF+32 μs for an EHT packet, while the start of L-STF+40 μs for extremely high throughput-extended long-range (EHT-ELR) packet format.

FIG. 6 shows an Rx FSM 600 that may be used to design the receiver STA 104 in accordance with a fourth embodiment of the invention. Similar to Rx FSM 300, the Rx FSM 600 includes the states 302-322. However, after state 306, when the LSTF correlator is triggered, the ELRSTF corrector is stopped. Also, at state 318, if the packet passes the CRC check, then the ELRSTF corrector may be stopped if the ELRSTF correlator is resumed.

Thus, in this embodiment, when the LSTF correlator is triggered, the ELRSTF correlator may be stopped. The ELRSTF correlator may operate again after the duration derived from the LENGTH of the L-SIG. When the ELR preamble is detected, the ELRSTF correlator and LSTF correlator may be stopped until the duration derived from the ELR-SIG field of the packet.

In summary, different designs of an Rx FSM for the receiver STA 104 to receive and process ELR and non-ELR packets have been disclosed. As described above, the ELRSTF correlator may be stopped upon detecting the packet as a non-ELR packet for estimated packet duration. Further, when the L-SIG parity fails, the ELRSTF correlator may remain operational. If the CRC check fails at U-SIG, the ELRSTF correlator may remain operational. Alternatively, the ELRSTF correlator may operate until the end of the expected ELR-STF field and may stop until the L-SIG derived length if the ELRSTF corrector is not triggered.

In some embodiments, the LRSTF correlator may operate up to the T_er duration regardless of whether the detected packet corresponds to a ELR packet or a non-ELR packet. When the LRSTF correlator is not triggered, the LRSTF correlator may stop until the end of packet processing. If the L-SIG parity fails, the ELRSTF correlator may remain operational. If the CRC check fails at the U-SIG, the ELRSTF correlator may remain operational. Alternatively, the ELRSTF may operate until the end of the expected ELR-STF field and may stop until the L-SIG derived length if the ELRSTF corrector is not triggered.

In some embodiments, when the packet is detected as a non-ELR and the CRC check has passed, the ELRSTF correlator may stop operating until the end of the packet duration. When the packet is detected as a non-ELR and the CRC check has failed, then ELRSTF correlator may operate until the end of the expected ELRSTF field (T_usig+T_er) and may stop until the L-SIG derived length if the ELRSTF corrector is not triggered. Further, when the L-SIG parity has failed, the ELRSTF correlator may remain operational.

In another embodiment, when the LSTF correlator is triggered, the ELRSTF correlator may be stopped. If the L-SIG parity has failed, the ELRSTF correlator may remain operational. Further, when the CRC check at U-SIG has failed, the ELRSTF correlator may stop until the L-SIG indicated duration.

As noted above, in some embodiments, the receiver STA 104 uses dual FSMs to receive and process ELR packets and non-ELR packets. The use of dual FSMs for the receiver STA 104 is described below.

Figure 7:
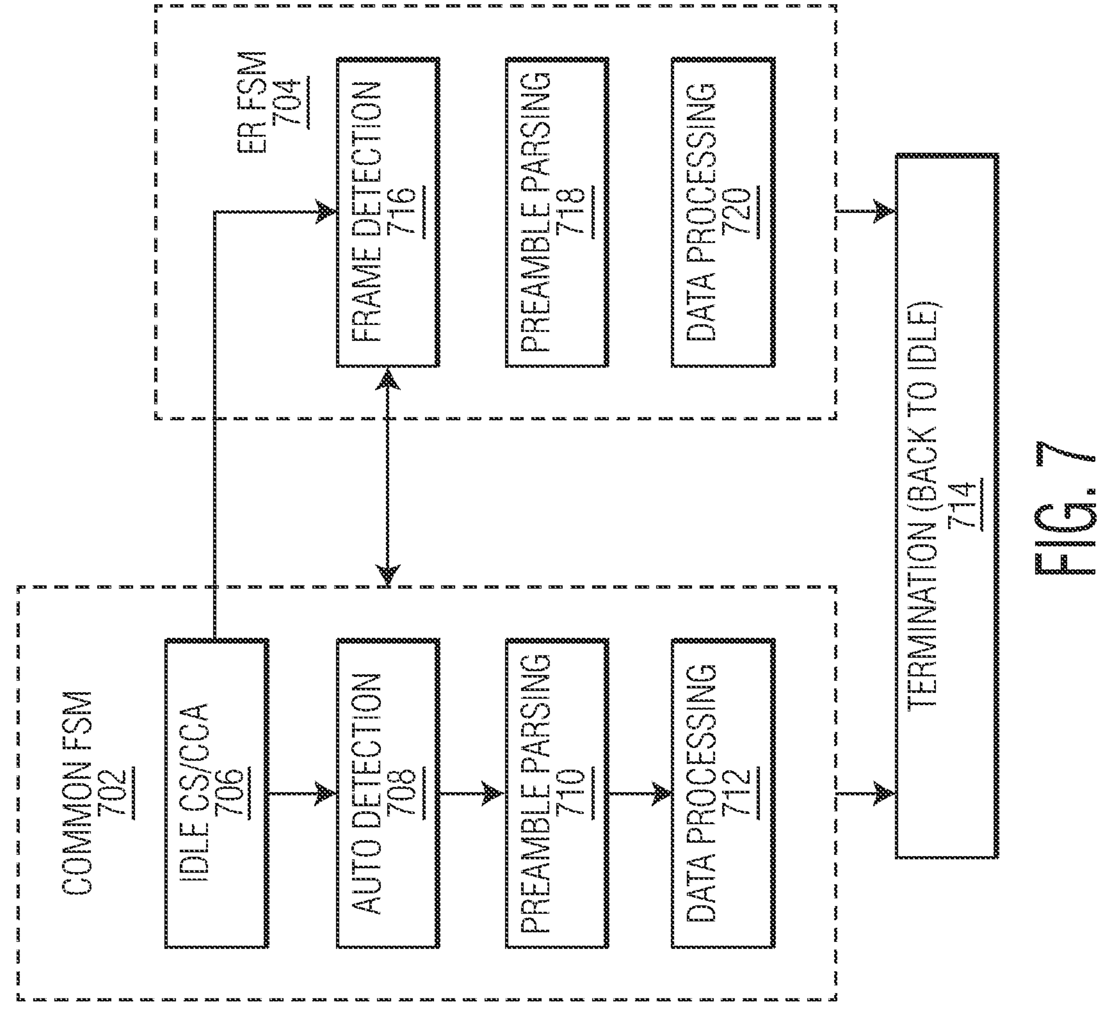
FIG. 7 illustrates a common Finite State Machine (FSM) and an ELR FSM used by the receiver STA in accordance with an embodiment of the invention.

As illustrated in FIG. 7, in an embodiment, the receiver STA 104 uses a common Finite State Machine (FSM) 702 and an ELR FSM 704. Most of the common FSM 702 is used to process non-ELR packets, while the ELR FSM 704 is used to process ELR packets. The common FSM 702 includes (1) a carrier sense/clear channel assessment (CS/CCA) stage 706, (2) an autodetection stage 708, (3) a preamble parsing stage 710, and (4) a data processing stage 712. At the CS/CCA stage 706, the presence of a WiFi packet is detected. At the autodetection stage 708, the correct WiFi generation is classified. At the preamble parsing stage 710, the essential reception parameters are learned. At the data processing stage 712, the decoding is executed and the results are fed to upper layers. In addition, there are termination procedures located in each of these stages, which is illustrated in FIG. 7 as a termination stage 714.

The ELR FSM 704, which is designed to interact with the common FSM 702, is activated only when CS/CCA is triggered. The ELR FSM includes (1) a frame/format detection stage 716, (2) a preamble parsing stage 718, and (3) a data processing stage 720. At the frame/format detection stage 716, the ELR format is classified. In addition, an interaction with the common FSM happens at this stage. In some embodiments, the ELR formation indication may be performed at this stage, which is an indirect way of detecting the ELR format of the received packet using particular information contained in the received packet. At the preamble parsing stage 718, the essential reception parameters are learned, which may be identical to the preamble parsing stage 710 of the common FSM 702. At the data processing stage 720, the decoding is executed and the results are fed to upper layers, which may be identical to the data processing stage 712 of the common FSM 702. Again, there may be termination procedures located in each of these stages to transition to the termination stage 714.

Upon receiving a packet, an Ultra High Reliability (UHR) ELR PPDU can be classified based on ELR format detection or ELR format indication. ELR format detection can be determined by a range of methods. In an embodiment, ELR format detection may be determined by one or more of the following methods: (a) correlation of ELR-STF (if present) and/or ELR-LTF, (b) pattern detection, e.g. repetition check or polarity check, (c) ELR-SIG decoding and (d) X-SYM auto detection, where X-SYM (may or may not be a SIG field) could be used for ELR format detection.

In an embodiment, ELR format detection has a start time Ts and an end time Te. The start time Ts may be: (1) if the ELR format detection starts after LP3, then Ts may be 32 us from the start of the packet, (2) if the ELR format detection starts after LP3 plus some X-SIG symbols, e.g. two UHR-SIG symbols of duration 8 us, then Ts may be 40 us from the start of the packet, or (3) Ts may be the time defined by (1) or (2) deducted by some ramp up time.

The end time Te may be: (1) end of ELR-STF (if present), the exact duration of ELR-STF is determined by the format of ELR-STF, (2) end of ELR-LTF, the exact duration of ELR-LTF is determined by the format of ELR-STF (if present) and the format of ELR-LTF, or (3) end of ELR-SIG, the exact duration of ELR-SIG is determined by the format of ELR-STF (if present) and the format of ELR-LTF plus ELR-SIG.

As noted above, upon receiving a packet, a UHR ELR PPDU can be classified based ELR format indication so that the ELR FSM 704 can take over the reception process. In an embodiment, if the receiver STA 104 can parse the ELR format from U-SIG, it may bypass or continue ELR format detection.

In an embodiment, once CS/CCA triggers, the common FSM 702 should run first, and the ELR FSM 704 should countdown to start. By the time marked with LP3, the receiver STA 104 should decide if the received packet is a non-HT, HT, VHT, HE, EHT or UHR packet or enter an ErrorAbort state. Some of these determinations may happen before LP3. It is noted here that LP3 is only symbolic and has different contexts for different WiFi generations. The ErrorAbort state may be entered when there are errors from L-SIG parity failure, CRC check failure, filtered PPDU, etc.

If the receiver STA 104 decides to ErrorAbort by LP3, what happens next depends on whether receive time (RXTIME) of the packet can be evaluated or cannot be evaluated. If RXTIME can be evaluated, (1) ELR frame/format detection terminates, and the common FSM 702 holds CCA until the elapse of RXTIME, or (2) ELR frame/format detection continues countdown to start and the common FSM holds CCA until the elapse of: (a) RXTIME, if an ELR packet is detected before RXTIME, then follows the ELR FSM 704 and cancels ErrorAbort, otherwise follows the common FSM, or (b) max of RXTIME and Te, if an ELR packet is detected by Te, then follows the ELR FSM and cancels ErrorAbort, otherwise follows the common FSM.

If RXTIME cannot be evaluated, (1) ELR frame/format detection terminates, and the common FSM 702 goes back to an IDLE state 706, or (2) ELR frame/format detection continues countdown to start and the common FSM (a) goes back to the IDLE state, if an ELR packet is detected by Te, then follows the ELR FSM 704 and cancels ErrorAbort, otherwise follows the common FSM, or (b) holds CCA until the elapse of Te, if an ELR packet is detected by Te, then follows the ELR FSM and cancels ErrorAbort, otherwise follows the common FSM.

In an embodiment, if the receiver STA 104 decides not to enter the ErrorAbort state (CRC pass, regardless of L-SIG parity check) by LP3, what happens next depends on whether an exit condition is met in the later stage of the common FSM 702. If the exit condition is met in the later stage of the common FSM, (1) the ELR frame/format detection terminates, and the common FSM holds CCA until the elapse of RXTIME, (2) the ELR frame/format detection continues countdown to start and the common FSM holds CCA until the elapse of: (a) RXTIME, if an ELR packet is detected before RXTIME, then follows the ELR FSM 704 and cancels exit, otherwise follows the common FSM, or (b) max of RXTIME and Te, if an ELR packet is detected by Te, then follows the ELR FSM 704 and cancels exit, otherwise follows the common FSM.

If the exit condition is not met in the later stage of the common FSM 702, (a) the ELR frame/format detection terminates, and the common FSM confirms the state and continues processing until the elapse of RXTIME (if UHR ELR format is indicated in U-SIG and the common FSM detects such state, the common FSM naturally switches into the ELR FSM 704) or (2) the ELR FSM continues countdown to start and the common FSM continues processing until the elapse of: (a) RXTIME, if an ELR packet is detected before RXTIME, then follows the ELR FSM and interrupts the common FSM, otherwise follows the common FSM, or (b) max of RXTIME and Te, if an ELR packet is detected by Te, then follows the ELR FSM and interrupts the common FSM, otherwise follows the common FSM.

In an embodiment, if an ELR packet is detected when the common FSM 702 is in a termination state, and if the CCA is busy and once the ELR packet is detected, a new semantic in PHY-RXEND.indication( ) is introduced to revoke the previous RXEND decision, such as PHY-RXEND.indication(NotEnd). When an ELR packet is detected, (1) PHY_CCA.indication(BUSY,primary) is set, (2) RXTIME is updated to make sure there is enough time to decode ELR-SIG, and (3) RXTIME is updated again after ELR-SIG decoding.

In addition, a new PHY primitive PHY-RXPAUSE.indication is introduced. This primitive is an indication by the PHY to the local MAC entity that the PPDU currently being received is paused. This primitive is not generated until the PHY has determined ELR trigger or ELR pass. The semantics of this new primitive is PHY-RXPAUSE.indication (STATE), where the STATE parameter can be one of two values: ELR trigger or ELR pass. The effects of receipt are:

- The effect of receipt of this primitive is for the MAC to begin pausing Physical Service Data Unit (PSDU) reception.
- Once PHY-RXSTART.indication is re-issued by the PHY, MAC should prepare for a new receive flow.
- MAC should discard the previously received PSDU and do not request acknowledgement (ACK)/block acknowledgment (BA).
- The discard event can happen upon the reception of PHY-RXPAUSE.indication or re-issued PHY-RXSTART.indication (including RX termination if PHY-RXSTART.indication is never re-issued).

In an embodiment, if ELR packet reception is from a triggered transmission, then: (1) a check for the presence of WiFi packet is performed and the CS/CCA stage 706 is entered, (2) the remaining common FSM 702 is bypassed, so no interactions between dual FSMs are needed, (3) the ELR FSM 704 should count down to start once CS/CCA triggers, and/or (4) the ELR FSM 704 goes to the ELR frame/format detection, preamble parsing and data processing.

In this context, a triggered transmission may mean: (a) channel is reserved for a duration between the relevant devices where one device will communicate only through ELR packet format, or (b) the ELR receiving device may initiate the transmission protocol similar to that of uplink orthogonal frequency-division multiple access (UL-OFDMA)/uplink multiuser multiple-input and multiple-output (UL-MUMIMO) transmission.

Figure 8:
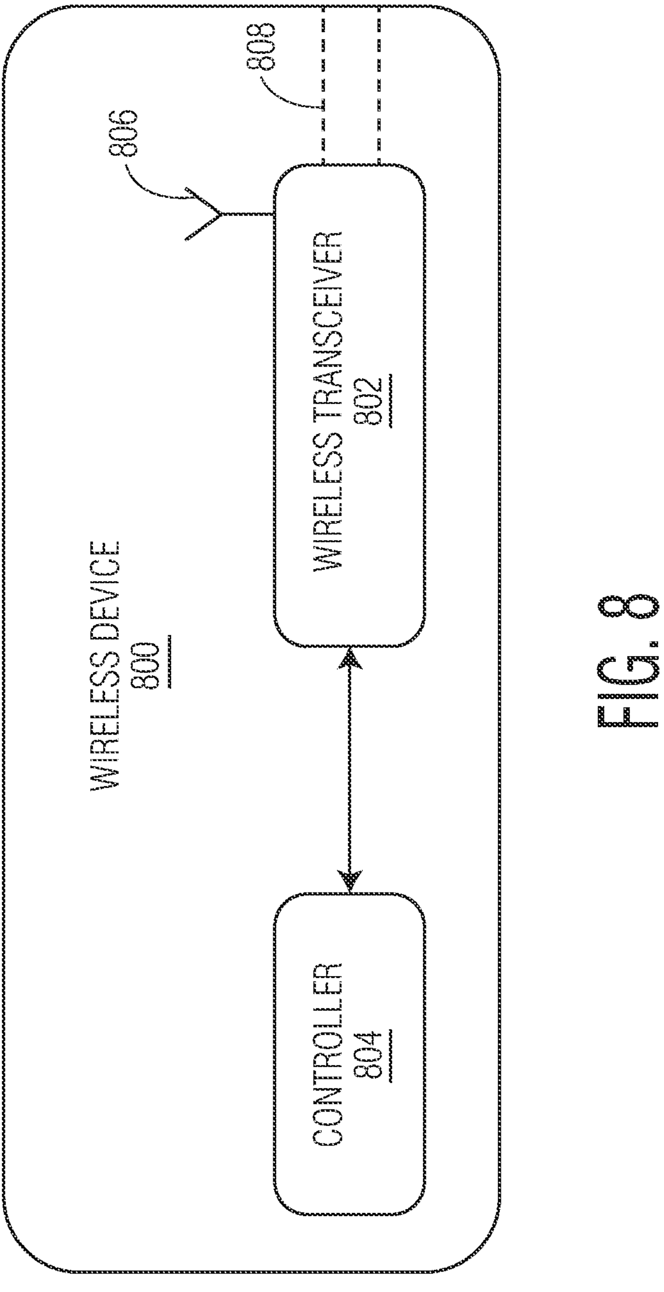
FIG. 8 depicts a wireless device in accordance with an embodiment of the invention.

FIG. 8 depicts a wireless device 800 in accordance with an embodiment of the invention. The wireless device 800 can be used in the communications system 100 depicted in FIG. 1. For example, the wireless device 800 may be an embodiment of the transmitter STA 102 or the destination STA 104 depicted in FIG. 1.

In the embodiment depicted in FIG. 8, the wireless device 800 includes a wireless transceiver 802, a controller 804 operably connected to the wireless transceiver, and at least one antenna 806 operably connected to the wireless transceiver. In some embodiments, the wireless device 800 may include at least one optional network port 808 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol). In some embodiments, the wireless device 800 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port.

Figure 9:
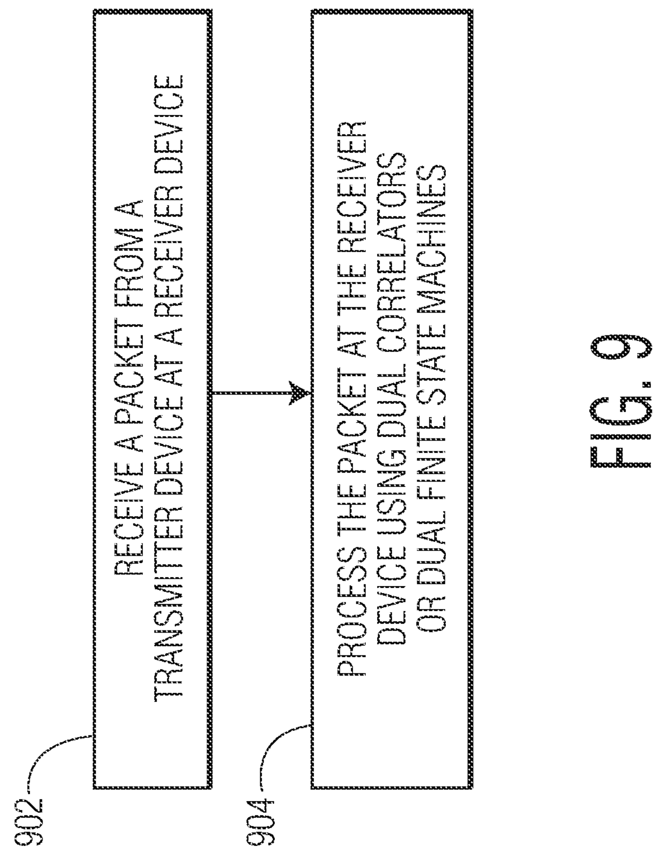
FIG. 9 illustrates a flow diagram of a method of processing received frames at a receiver device in accordance with an embodiment of the invention.

A method of processing received frames at a receiver device in accordance with an embodiment of the invention is described with reference to a flow diagram of FIG. 9. At block 902, a frame from a transmitter device is received at the receiver device. At block 904, the packet at the receiver device is processed using dual correlators or dual finite state machines. The dual correlators include a first correlator to detect extended long-range (ELR) packets and a second correlator to detect non-ELR packets. The dual FSMs include a first FSM to process the ELR packets and a second FSM to process the non-ELR packets.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A receiver device comprising:

a wireless transceiver arranged to receive and transmit packets; and a controller operably coupled to the wireless transceiver to process the packets, wherein the controller is configured to:

receive a packet from a transmitter device; and process the packet using one or more of dual correlators and dual finite state machines (FSMs), wherein the dual correlators include a first correlator to detect extended long-range (ELR) packets and a second correlator to detect non-ELR packets, and wherein the dual FSMs include a first FSM to process the ELR packets and a second FSM to process the non-ELR packets.

2. The receiver device of claim 1, wherein the controller is configured to stop the first correlator when the packet is detected as a non-ELR packet.

3. The receiver device of claim 1, wherein the controller is configured to, when the second correlator is triggered and when a legacy signal (L-SIG) parity check has failed, keep the first correlator running.

4. The receiver device of claim 1, wherein the controller is configured to, when the second correlator is triggered and when a cyclic redundancy check (CRC) check fails at a Universal Signal (U-SIG) element of the packet, one of keep the first correlator running and allow the first correlator to run until an end of expected extended long-range short training field (ELR-STF) field and stop the first correlator until a legacy signal (L-SIG) derived length when the first correlator is not triggered as a positive correlation of a particular sequence input.

5. The receiver device of claim 1, wherein the controller is configured to keep the first correlator running up to a T_er duration when the packet is detected as a non-ELR packet and stop the first correlator until an end of packet processing for the packet when the first correlator is not triggered as a positive correlation of a particular sequence input, where T_er is a duration of an extended long-range short training field (ELR-STF) field in the packet.

6. The receiver device of claim 1, wherein the controller is configured to, when the packet is detected as a non-ELR packet and the packet has passed a cyclic redundancy check (CRC) check, stop the first correlator until an end of a packet duration.

7. The receiver device of claim 1, wherein the controller is configured to, when the packet is detected as a non-ELR packet and the packet has failed a cyclic redundancy check (CRC) check, keep the first correlator running until an end of an expected extended long-range short training field (ELR-STF) field (T_usig+T_er) and stop the first correlator until a legacy signal (L-SIG) derived length when the first correlator is not triggered, where T_er is a duration of an extended long-range short training field (ELR-STF) field in the packet and T_usig is a duration from a start of a legacy short training field (L-STF) until an end of a Universal Signal (U-SIG) field.

8. The receiver device of claim 1, wherein the controller is configured to stop the first correlator when the second correlator gets triggered as a positive correlation of a particular sequence input.

9. The receiver device of claim 1, wherein the controller is configured to, when a cyclic redundancy check (CRC) check fails at a Universal Signal (U-SIG) element of the packet, stop the first correlator until a legacy signal (L-SIG) indicated duration.

10. The receiver device of claim 1, wherein the first FSM includes a frame detection stage, where the packet is classified as an ELR packet using an ELR format detection or an ELR format indication.

11. The receiver device of claim 10, wherein the ELR format detection includes a start time based on the start of the packet.

12. The receiver device of claim 10, wherein the controller is configured to control the ELR format detection based on whether a receive time (RXTIME) of the packet is evaluated when the receiver device enters an ErrorAbort state based on a legacy payload 3 (LP3) field of the packet.

13. The receiver device of claim 10, wherein the controller is configured to control the ELR format detection based on whether an exit condition is met when the receiver device does not enter an ErrorAbort state based on a legacy payload 3 (LP3) field of the packet.

14. The receiver device of claim 10, wherein the controller is configured to allow only one of the first and second FSMs to be active.

15. The receiver device of claim 1, wherein the controller is configured to use one or more primitives to support interactions of the dual FSMs with a media access control (MAC) of the receiver device.

16. A method of processing received frames at a receiver device, the method comprising:

receiving a packet from a transmitter device at the receiver device; and processing the packet at the receiver device using one or more of dual correlators and dual finite state machines (FSMs), wherein the dual correlators include a first correlator to detect extended long-range (ELR) packets and a second correlator to detect non-ELR packets and wherein the dual FSMs include a first FSM to process the ELR packets and a second FSM to process the non-ELR packets.

17. The method of claim 16, wherein processing the packet includes stopping the first correlator when the packet is detected as a non-ELR packet.

18. The method of claim 16, wherein processing the packet includes keeping the first correlator running when the second correlator is triggered and when a legacy signal (L-SIG) parity has failed.

19. The method of claim 16, wherein processing the packet includes stopping the first correlator when the second correlator has triggered as a positive correlation of a particular sequence input.

20. A receiver device comprising:

a wireless transceiver arranged to receive and transmit packets; and a controller operably coupled to the wireless transceiver to process the packets, wherein the controller is configured to:

receive a physical layer protocol data unit (PPDU) from a transmitter device; and process the PPDU using one or more of dual correlators and dual finite state machines (FSMs), wherein the dual correlators include a first correlator to detect extended long-range (ELR) PPDUs and a second correlator to detect non-ELR PPDUs, and wherein the dual FSMs include a first FSM to process the ELR PPDUs and a second FSM to process the non-ELR PPDUs.

* * * * *